(12) United States Patent
Shi et al.

(10) Patent No.: US 10,597,582 B2
(45) Date of Patent: *Mar. 24, 2020

(54) ACRYLATE-BASED SULFUR SCAVENGING AGENTS FOR USE IN OILFIELD OPERATIONS

(71) Applicant: Multi-Chem Group, LLC, San Angelo, TX (US)

(72) Inventors: Liu Shi, Houston, TX (US); Funian Zhao, Tomball, TX (US); Liangwei Qu, Spring, TX (US); Michael Harless, Humble, TX (US); Ron Hoppe, Calgary (CA)

(73) Assignee: Multi-Chem Group, LLC, Houston, TX (US)

(*) Notice: Subject to any disclaimer, the term of this patent is extended or adjusted under 35 U.S.C. 154(b) by 85 days.

This patent is subject to a terminal disclaimer.

(21) Appl. No.: 15/528,186

(22) PCT Filed: Dec. 23, 2014

(86) PCT No.: PCT/US2014/072070
§ 371 (c)(1),
(2) Date: May 19, 2017

(87) PCT Pub. No.: WO2016/105370
PCT Pub. Date: Jun. 30, 2016

(65) Prior Publication Data
US 2017/0335188 A1  Nov. 23, 2017

(51) Int. Cl.
*C09K 15/06* (2006.01)
*C09K 8/532* (2006.01)
(Continued)

(52) U.S. Cl.
CPC .......... *C09K 15/06* (2013.01); *B01D 19/0005* (2013.01); *C02F 1/20* (2013.01);
(Continued)

(58) Field of Classification Search
CPC .. B01D 19/0005; C02F 1/20; C02F 2101/101; C02F 2103/10; C09K 15/06;
(Continued)

(56) References Cited

U.S. PATENT DOCUMENTS

| 3,459,852 A | 8/1969 | Roehm |
| 3,488,294 A | 1/1970 | Annand et al. |

(Continued)

FOREIGN PATENT DOCUMENTS

| WO | 2005085591 A1 | 9/2005 |
| WO | 2014187566 A1 | 11/2014 |
| WO | 2015153286 A1 | 10/2015 |

OTHER PUBLICATIONS

Examination Report issued in related Australian Patent Application No. 2014414821, dated Jul. 18, 2018, 3 pages.
(Continued)

*Primary Examiner* — Frances Tischler
(74) *Attorney, Agent, or Firm* — Tenley Krueger; Baker Botts L.L.P.

(57) ABSTRACT

Composition for the removal or inactivation of hydrogen sulfide or soluble sulfide ion other species comprising ionizable sulfur (e.g., mercaptans, thiols, etc.) using compositions containing acrylate and/or derivatives thereof are provided. Methods for the removal or inactivation of hydrogen sulfide or other sulfur species in oilfield sites and other related applications using compositions containing acrylate and/or derivatives thereof are provided.

7 Claims, 3 Drawing Sheets

(51) Int. Cl.
  B01D 19/00   (2006.01)
  C02F 1/20    (2006.01)
  C09K 8/52    (2006.01)
  C09K 8/54    (2006.01)
  C02F 101/10  (2006.01)
  C02F 103/10  (2006.01)

(52) U.S. Cl.
  CPC ............... *C09K 8/52* (2013.01); *C09K 8/532* (2013.01); *C09K 8/54* (2013.01); *C02F 2101/101* (2013.01); *C02F 2103/10* (2013.01); *C09K 2208/20* (2013.01); *Y02W 10/37* (2015.05)

(58) Field of Classification Search
  CPC ...... C09K 2208/20; C09K 8/52; C09K 8/532; C09K 8/54; Y02W 10/37
  See application file for complete search history.

(56) References Cited

U.S. PATENT DOCUMENTS

| | | | |
|---|---|---|---|
| 4,680,127 | A | 7/1987 | Edmondson |
| 4,795,575 | A | 1/1989 | Southwick et al. |
| 5,789,349 | A | 8/1998 | Patel |
| 8,357,306 | B2 | 1/2013 | Yang et al. |
| 2003/0226808 | A1* | 12/2003 | Fidoe .................. C23F 14/02 210/699 |
| 2010/0105580 | A1 | 4/2010 | Becker |
| 2012/0004393 | A1 | 1/2012 | Lambris et al. |
| 2012/0149117 | A1 | 6/2012 | Lawrence et al. |
| 2012/0152857 | A1 | 6/2012 | Yang et al. |
| 2012/0247763 | A1 | 10/2012 | Rakitsky et al. |
| 2013/0092597 | A1 | 4/2013 | Stark et al. |
| 2013/0101473 | A1 | 4/2013 | Harless et al. |
| 2013/0277055 | A1 | 10/2013 | Favero |
| 2014/0166288 | A1 | 6/2014 | Bailey et al. |

OTHER PUBLICATIONS

International Preliminary Report on Patentability issued in related Application No. PCT/US2014/072070, dated Jul. 6, 2017 (8 pages).
Office Action issued in related AU Application No. 2014414821, dated Aug. 21, 2017 (8 pages).
International Search Report and Written Opinion issued in related PCT Application No. PCT/US2014/072070 dated Jul. 29, 2015, 11 pages.
Gershbein, Leon L., and Charles D. Hurd. "The reaction of hydrogen sulfide with acrylonitrile, acrylic ester and crotonaldehyde." Journal of the American Chemical Society 69.2 (1947): 241-242.

* cited by examiner

ACRYLATE-BASED SULFUR SCAVENGING AGENTS FOR USE IN OILFIELD OPERATIONS

CROSS-REFERENCE TO RELATED APPLICATION

The present application is a U.S. National Stage Application of International Application No. PCT/US2014/072070 filed Dec. 23, 2014, which is incorporated herein by reference in its entirety for all purposes.

BACKGROUND

The present disclosure of this application relates to the removal or inactivation of hydrogen sulfide or other species comprising ionizable sulfur (e.g., mercaptans, thiols, etc.) which may be encountered in wells which penetrate subterranean formations such as oil wells, gas wells and the like. Fluids in sewage systems, fluids produced from wells and make-up fluids also frequently contain hydrogen sulfide. Hydrogen sulfide gas is toxic with a density heavier than air, and therefore removal or inactivation of this sulfide ion is necessary to prevent poisoning of surrounding personnel and contamination of the area. Moreover, hydrogen sulfide gas is highly corrosive to the pipeline and equipment used in the operation of an oil well. Therefore, removing hydrogen sulfide from produced fluid (i.e., oil and water) and gas is necessary for the safe production of oil.

Drilling a well in a hydrocarbon bearing subterranean formation for the production of hydrocarbons from said formation typically involves use of a drilling apparatus and drilling fluid. The drilling apparatus usually comprises a bit mounted on a string of hollow steel pipe. This hollow pipe is often used to rotate the bit to enable the bit to cut into the formation. The hollow pipe also acts as a conduit for the drilling fluid to be pumped down to the bottom of the hole, from where it rises to the surface via the annulus between the drill string and the borehole wall. The drilling fluid has many functions, one of the most important of which is to convey the cuttings from the bit downhole up to the surface of the well.

In drilling some subterranean formations, and often particularly those bearing oil or gas, hydrogen sulfide accumulations are frequently encountered. The drilling fluid brings the hydrogen sulfide to the surface. Such sulfide in the drilling fluid is problematic because it can corrode the steel in the drilling apparatus and may be liberated into the atmosphere as toxic sulfide gas at the well surface. Generally, to protect the health of those working with the drilling fluid and those at the surface of the well, conditions should be maintained to ensure that the concentration of hydrogen sulfide above the fluid, emitted due to the partial pressure of the gas, is less than about 15 ppm.

Triazine-based hydrogen sulfide scavengers have been commonly used in the the oil and gas industry, but triazine can increase pH values of produced water and cause scale problems. Moreover, triazine-based scavengers contain nitrogen, which normally causes problems downstream such as corrosion and damage to refining catalysts. Nitrogen-free scavengers such as formaldehyde, glyoxal, and acrolein have their own problems such as toxicity, corrosivity, and safety issues, which may create added difficulties for transportation, storage, and operation.

BRIEF DESCRIPTION OF THE FIGURES

These drawings illustrate certain aspects of some of the embodiments of the present disclosure, and should not be used to limit or define the disclosure.

Figure 1:
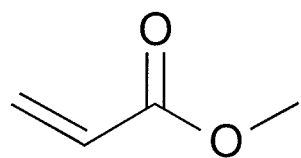
FIGS. 1 and 2 are diagrams illustrating the chemical structure of sulfur scavenging additives according to certain embodiments of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure of this application relates to the removal or inactivation of hydrogen sulfide or other species comprising ionizable sulfur using compositions containing acrylate and related compounds. More specifically, the present disclosure provides acrylate-based compounds for use as a sulfur scavenger in various operations. In certain embodiments, the acrylate-based additive may interact with one or more sulfur species to reduce the amount of or inactivate (i.e., render the sulfur atoms in the sulfur species non-ionizable) at least a portion of the sulfur species present, The sulfur scavenging additives of the present disclosure may comprise any acrylate-based compound known in the art. Methyl acrylate (IUPAC name 2-methylpropenoic acid) is an example of one embodiment of the acrylate used in accordance with the disclosed subject matter. The acrylate-based additives of the present disclosure may be less reactive than certain conventional sulfide scavengers (such as acrolein), which, in certain embodiments, may make it less volatile, less toxic, easier to handle, and more stable to store for periods of time than acrolein. In certain embodiments, the acrylate-based additives of the present disclosure may cause less corrosion and/or form less scale in their use under certain conditions. Also, acrylate's lower reactivity may make acrylate more suitable for combining with other additives.

In certain embodiments, the additives may include a compound of the general formula:

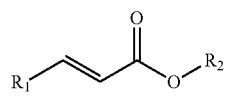

where $R_1$ represents any atom or functional group that can increase the activity of the adjacent double bond, such as a hydrogen atom, alkyl groups, alkene groups, alkyne groups (any of which may be substituted, unsubstituted, linear, branched, cyclic, or acyclic), and any combination or derivative thereof; and $R_2$ may be any hydrocarbon chain of any length and/or structure (including substituted, unsubstituted, linear, branched, cyclic, or acyclic chains). For example, in some embodiments, $R_1$ may comprise a C1 to C20 carbon chain of any of the aforementioned structures comprising an ester group, an ether group, a carbonyl group, a carbonyl amide group, a urea group, a urethane group, or any combination thereof. In certain embodiments $R_2$ may comprise a C1 to C20 carbon chain of any of the aforementioned structures. In certain embodiments, the additive of the present disclosure may include a combination of different compounds having this formula.

The treatment fluids comprising additives of the present disclosure may be hydrophobic, hydrophilic, or mixtures thereof, and may also include a solvent. The solvent may be an aromatic solvent, such as Aromatic 100, Aromatic 150, kerosene, diesel, or mixtures thereof. The concentration of the solvent within the treatment fluid may be from about 1 to about 99 wt %. The concentration of the compound within the treatment fluid may be from about 1 to about 99 wt % of the treatment fluid. The treatment fluid may also include a corrosion inhibitor, a dehazer, and/or a conductivity improver.

Figure 2:
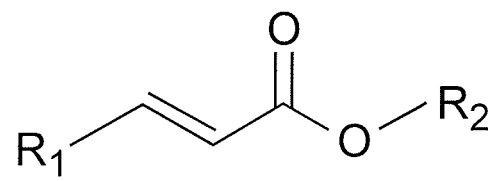

As used herein, the term "acrylate" and "acrylate-based additive" includes all compounds containing the acrylate ion ($CH_2=CHCOO-$), their salts and esters, as well as all derivatives thereof that are formed by substituting one or more H atom of the acrylate molecule with any R groups. For example, FIG. 1 shows methyl acrylate, which may be used in accordance with certain embodiments of the present disclosure. In addition, acrylate derivatives can also be used in accordance with the present disclosure. FIG. 2 shows a generic acrylate derivative, wherein $R_1$ represents any functional group that can increase the activity of the adjacent double bond and $R_2$ represents a carbon chain of any length, including linear or branched chains. Moreover, the H atoms shown in FIGS. 1 and 2 can be replaced with R groups (i.e., side chains). Any R group substitution is acceptable. In certain embodiments, larger, more complicated R groups may result in decreased reactivity of the sulfur scavenger. In addition, certain embodiments include sulfur scavenging functionalities in the R groups such as acrylonitrile.

In accordance with certain embodiments, a variety of suitable carrier fluids may be used to deliver the acrylate. Acrylate is typically oil soluble, and therefore, oil-based carrier fluids can be used in certain embodiments. However, in certain embodiments, acrylate compositions used according to the present disclosure may be used in aqueous fluids (e.g., aqueous liquids) as well. In certain embodiments, the concentration of acrylate used in the carrier fluid (or any fluid into which the acrylate is introduced) may be from about 0.5% to about 15% by weight of the fluid. At high temperatures, concentrations in a different range may be used, among other reasons, for example, to avoid polymerization of the acrylate monomers. In certain embodiments, the acrylate-based additives of the present disclosure may be used at a neutral to slightly basic pH, among other reasons, because scale forms a higher pH and lower pH leads to acidic corrosion. However, a slightly acidic pH (e.g., around 5) is also suitable, though it may result in a slower reaction. In certain embodiments, temperature of the reaction may be 100° F. or higher, although other suitable temperatures may be used depending on the desired rate of reaction.

Figure 3:
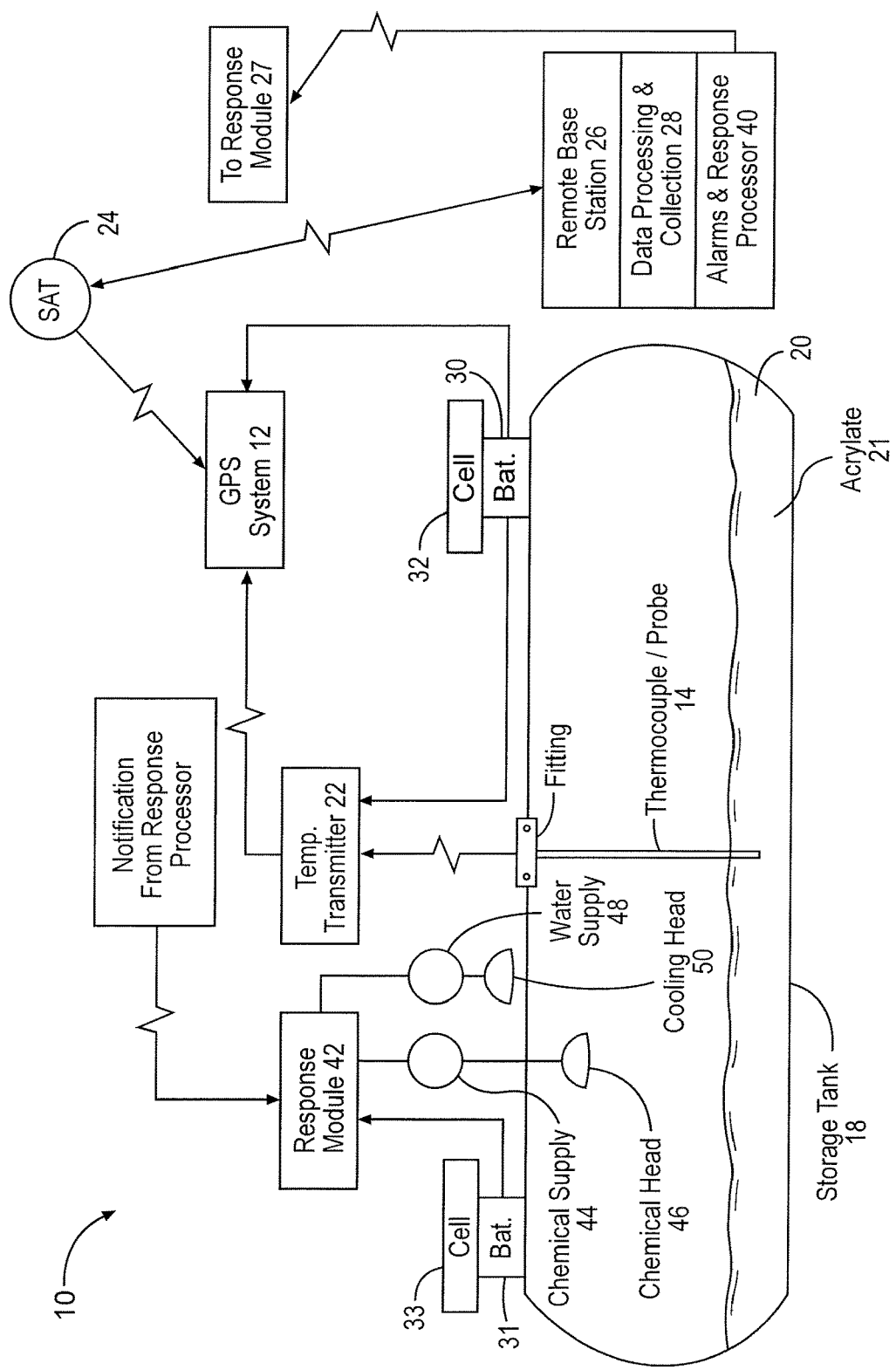
FIG. 3 is a diagram illustrating a closed tank system used to apply certain embodiments of the sulfur scavenging additives of the present disclosure.

In certain embodiments, acrylate or related compounds may be employed in a closed system to avoid exposure to the surrounding environment and personnel. To avoid exposure of acrylate or related compounds to the environment or personnel, certain embodiments may employ a closed tank system such as shown in FIG. 3. In certain embodiments, the apparatus illustrated in FIG. 3 may include a commercially available GPS receiver/transmitter that has the capability to process 4-20 mA data signals. An example of the type of GPS receiver/transmitter which may be used is a unit produced by Satamatics Ltd. (Model TAM210-Inmarsat D+ Transreceiver).

In certain embodiments, a temperature probe 14 (tapered thermowell with two type thermocouples) may be inserted into an acrylate (or related compound) storage tank 18 via a threaded fitting 16. The thermowell probe 12 is of sufficient length to extend into the liquid acrylate 20 (typically within 4 inches of the tank bottom) to ensure that any exothermic reaction is detected quickly (within 30 seconds of reaching the alarm set point temperature).

In certain embodiments, a thermocouple may be attached externally directly to the shell of the field application type using thermally conductive epoxy glue, yet beneath the thermal insulation protection layer.

In certain embodiments, field application tanks 18 may have diameters that range from 36" to 40" and ISO tanks diameters are around 86" diameter. Thus, temperature probes 14 will usually range in length between 32" and 82". One of the thermocouples may be connected to a temperature transmitter head 22. A second thermocouple (not shown) is a spare to be used in the event that the first one fails. This will require connection of the alternate thermocouple leads to the temperature transmitters when the spare is employed. The temperature transmitter head 22 may send a 4-20 ma signal to the GPS unit 12.

In certain embodiments, the temperature transmitter 22 employed may be designed to transmit temperature data between 0° Celsius (32° F.) and 50° Celsius (122° F.). The mA signal may be proportional to temperature (i.e., a 4 mA signal is sent for a 0° Celsius temperature and a 20 mA signal is sent for a 50° Celsius temperature).

In certain embodiments, the GPS unit 12 may transmit temperature and location data at certain time intervals (e.g., two times per day) to a satellite that relays the data to a base station 26. This data may be processed and populate a database 28, and the relevant information may be accessible via a website. The GPS unit 12 may be further programmed to instantly transmit temperature data, regardless of the last time data was transmitted, if a pre-programmed temperature threshold is exceeded. The temperature threshold may be intended to correlate to the polymerization reaction of the acrylate. This pre-programmed alarm threshold is typically 100° Fahrenheit (38° C.), but may be varied as ambient storage conditions dictate (e.g. summer temperatures in desert environments that reach 40° Celsius (104° F.) or higher may require a higher alarm threshold).

Experiments have shown that the contents of vessels exposed to ambient outdoor temperatures in the summer months of July and August in sub-tropical climates (South Texas and Louisiana) do not exceed 90° Fahrenheit (32°–33° C.). However, the 100° F. threshold may be increased in extreme temperature environments encountered in such places as the deserts of the Middle East and even decreased if used in cold climates like Alberta, Canada. In certain embodiments, the range of alarm temperatures to be useful may include approximately between 80 and 120 degrees Fahrenheit.

In certain embodiments, the GPS unit 12 and temperature transmitter 22 may receive electrical power from a 12 volt sealed battery 30 that is charged by a solar panel/charge controller combination 32. The battery may be sized to provide 90 days of power to the GPS unit and transmitter head in the event of solar panel failure.

Certain embodiments may further utilize a response mechanism including an alarm and response processor 40 situated in the base station 26. For example, once the data from the GPS unit 12 is transmitted to the base station 26 via satellite 24, the data may be processed at a data processor collection unit 28.

In certain embodiments, the processed data may activate alarms and other responsive action in processor 40. In the event of a temperature excursion (temperature exceeding 100° F.), the GPS transceiver on the tank 12 may send a signal to the satellite that can relay the signal to the base station 26. This base station may be programmed to send notifications via email or other communication means 27 to key response personnel at the storage tank site (part of the response module 42). These personnel may respond in a number of ways, including accessing a website that details location and temperature of the acrylate vessel in question, contacting field personnel to investigate further, instructing local response personnel in emergency procedures (polymerization mitigation procedures to employ, evacuation of nearby personnel, contacting local emergency responders, etc.) This notification system may be coupled to automated equipment via cell phone service to activate water deluge systems to slow the rate of temperature increase, activate local audible and visual alarm systems, and inject emergency buffer solutions directly into the acrylate tank.

In certain embodiments, an automated response mechanism may activate the response module 42 directly via cell phone signal. Using this approach, after receiving the signal from the GPS system 12 indicating that a temperature excursion had occurred, the response processor 40 could activate the response module 42 via a cell phone link. The response module 42 could then send signals to activate alarm controllers or solenoid valves to initiate water deluge or emergency buffer solution injection as further described below.

In certain embodiments, as a result of the signal from the GPS unit 12, response module 42 may activate a chemical delivery unit having a chemical supply pump 44 to introduce chemicals into the tank 18 to control, stop or slow polymerization. Although the exact composition may vary, an example of such chemical is an emergency buffer solution having approximately 84% acetic acid, 8% hydroquinone, and 8% anhydrous sodium acetate. This pumped solution may be sprayed from chemical header 46 within the tank 18 or injected directly into the acrylate via a dip tube that extends into the tank. Dip tubes are generally an integral component of the storage tanks and are used as a means for discharging acrylate into the system being treated.

Alternatively, or in combination, as need be, response module 42 may activate a cooling solution delivery unit having a spray pump 48, whether automated or manual, to dispense cooling solution (for example, water) onto the surface of the tank 18 to reduce the external temperature and control the polymerization reaction of the acrylate 21 within the tank 18.

In certain embodiments, alarm and response process 40 may further provide visual and audible alarms to operators at the remote base station 26 so that actions may be taken to remove the tank to a safe location or to initiate evacuation of personnel to a safe distance away from the tank 18.

In certain embodiments, a method for remotely monitoring the temperature of acrylate in a storage tank may comprise the steps of:

providing the tank 18 with an internal temperature sensor or probe 14;

attaching the output of the probe 14 to a temperature transmitter 22 powered by a battery 30 having a solar panel/charge controller 32;

transmitting temperature data from the temperature transmitter 22 to a global positioning receiver/transmitter 12 and determining the location of the tank while in communication with a satellite 24;

receiving the transmitted temperature data and tank location data from the satellite at a remote base station 26;

processing and collecting the temperature and location data for comparing the processed temperature data to predetermined temperature set points 28; and initiating alarms and responses in a response processor 40 when the temperature data corresponds to the predetermined temperature set points and in appropriate environments.

In certain embodiments, further steps in the method may include:

additionally transmitting response data from the response process 40 to a response module 42 via the satellite 24 and the global positioning receiver/transmitter 12;

providing power to the response module from a battery 31 having a solar panel/charge controller 33; and activating a response to control a polymerization reaction of the acrylate 21 in the storage tank.

In certain embodiments, the base station may be programmed to send notifications via email to key response personnel who initiate and take responsive action through automated subsystem or manually take corrective action.

The acrylate-based additives and compounds of the present disclosure can be used as a sulfur scavenger in a variety of applications. These include downhole applications (e.g., drilling, fracturing, completions, oil production), use in conduits, containers, and/or other portions of refining applications, pipeline treatments, water disposal and/or treatments, and sewage disposal and/or treatments.

In certain embodiments of the present disclosure, the treatment fluids and/or additives of the present disclosure may be introduced into a subterranean formation, a well bore penetrating a subterranean formation, tubing (e.g., a pipeline), and/or container using any method or equipment known in the art. Introduction of the treatment fluids and/or additives of the present disclosure may in such embodiments include delivery via any of a tube, umbilical, pump, gravity, and combinations thereof. The treatment fluids and/or additives of the present disclosure may, in various embodiments, be delivered downhole (e.g., into the wellbore) or into top-side flowlines/pipelines or surface treating equipment.

For example, in certain embodiments, treatment fluids and/or additives of the present disclosure may be applied to a subterranean formation and/or well bore using batch treatments, squeeze treatments, continuous treatments, and/or combinations thereof. In certain embodiments, a batch treatment may be performed in a subterranean formation by stopping production from the well and pumping a specific amount or quantity of a treatment fluids or additive into a well bore, which may be performed at one or more points in time during the life of a well. In other embodiments, a squeeze treatment may be performed by dissolving acrylate, treatment fluids, or related additives in a suitable solvent at a suitable concentration and squeezing that solvent carrying the acrylate or related compound(s) downhole into the formation, allowing production out of the formation to bring the acrylate or related compound(s) to the desired location.

In still other embodiments, treatment fluids and/or additives of the present disclosure may be injected into a portion of a subterranean formation using an annular space or capillary injection system to continuously introduce the treatment fluid(s) and/or additive(s) into the formation. Other means and/or equipment that may be used to continuously inject treatment fluids and/or additives of the present disclosure into a well bore include, but are not limited to slip-stream systems, annulus drip systems, cap strings, umbilical strings, gas lift systems, continuous metering systems, subsurface hydraulic systems, bypass feeders, and the like.

In certain embodiments, such continuous injection equipment at a well site may be controlled from a remote location and/or may be partially or completely automated. In certain embodiments, a treatment fluid comprising acrylate or related compounds of the present disclosure may be circulated in the well bore using the same types of pumping systems and equipment at the surface that are used to introduce treatment fluids or additives into a well bore penetrating at least a portion of the subterranean formation. In certain embodiments, acrylate or related compounds of the present disclosure could be dried and formed into a solid for delivery into rat holes, tanks, and/or a wellbore.

Figure 4:
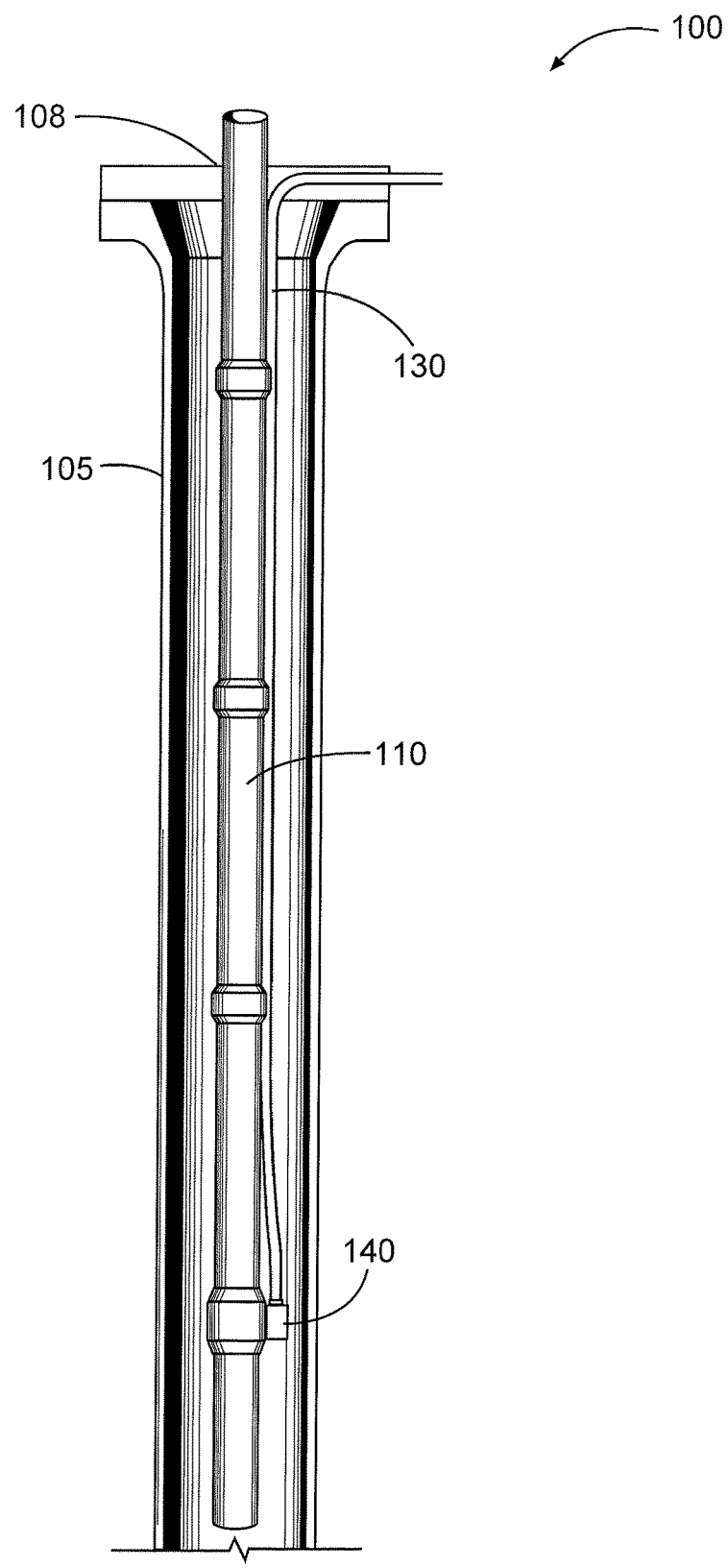
FIG. 4 is a diagram illustrating an injection system that may be used in accordance with certain embodiments of the present disclosure.

For example, acrylate or related additives of the present disclosure may be introduced into a well bore using a capillary injection system as shown in FIG. 4. Referring now to FIG. 4, well bore 105 has been drilled to penetrate a portion of a subterranean formation 100. A tubing 110 (e.g., production tubing) has been placed in the well bore 105. A capillary injection tube 130 is disposed in the annular space between the outer surface of tubing 110 and the inner wall of well bore 105. The capillary injection tube 130 is connected to a side-pocket mandrel 140 at a lower section of the tubing 110. Treatment fluids and/or solutions comprising acrylate or related additives may be injected into capillary injection tube 130 at the wellhead 108 at the surface (e.g., using one or more pumps (not shown)) such that it mixes with production fluid at or near the side-pocket mandrel 140. The system shown in FIG. 4 also may include one or more valves (not shown) at one or more locations along the capillary injection tube 130, among other reasons, to prevent flowback of fluid or gas to the surface through the tube. Other capillary injection systems and side pocket mandrel devices (e.g., those used in gas lift production) may be used in a similar manner to the system shown in FIG. 4.

In certain embodiments, an additive of the present disclosure may be added to a pipeline where one or more fluids enter the pipeline and/or at one or more other locations along the length of the pipeline. In these embodiments, the additive may be added in batches or injected substantially continuously while the pipeline is being used.

EXAMPLES

Table 1 below shows the results of an example test of one embodiment of the present disclosure. In this example, 150 mL of water containing 300 ppm hydrogen sulfide was adjusted to pH=8 in two sealed flasks. One sample was used as a control test without adding anything. The other was treated by a suitable amount of methyl acrylate solution (3%). This test was run at 55° C. for 1 hour. After the test, the blank sample still contained 250 ppm H2S. The results of the one with acrylate treatment are shown in Table 1.

TABLE 1

| Results of methyl acrylate treatment at pH = 8 | |
| --- | --- |
| Time (h) | $H_2S$ concentration (ppm) |
| 0 | 300 |
| 0.5 | <20 |
| 1 | 0 |

An embodiment of the present disclosure is a method comprising: providing a treatment fluid comprising a carrier fluid and an acrylate-based additive; and introducing the treatment fluid into at least a portion of a subterranean formation where one or more sulfur species are present.

Another embodiment of the present disclosure is a method comprising: providing a treatment fluid comprising a carrier fluid and an acrylate-based additive, and introducing the treatment fluid into at least a portion of a conduit or container where one or more sulfur species are present.

Another embodiment of the present disclosure is a method for scavenging a sulfur species from a sulfur-containing fluid, the method comprising: providing an additive comprising an acrylate-based compound, and introducing the acrylate-based compound into at least a portion of the sulfur-containing fluid.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:
1. A method comprising:
providing a treatment fluid comprising a carrier fluid and an acrylate-based additive, wherein the acrylate-based additive comprises at least one compound selected from the group consisting of compounds having the general formula:

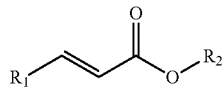

where $R_1$ is a functional group selected from the group consisting of an alkyl group, an alkene group, an alkyne group, an ester group, an ether group, and any combination thereof; and $R_2$ is a hydrocarbon chain;

introducing the treatment fluid into at least a portion of a subterranean formation where one or more sulfur species are present; and allowing the acrylate-based additive to interact with the sulfur species to reduce the amount of or inactivate at least a portion of the sulfur species present in the subterranean formation.

2. The method of claim 1 wherein the pH level of the treatment fluid is approximately neutral.

3. The method of claim 1 wherein the pH level of the treatment fluid is at least 5.

4. The method of claim 1 wherein the acrylate-based additive further comprises one or more acrylate derivatives.

5. The method of claim 4 wherein the one or more acrylate derivatives comprises an acrylate derivative containing a side chain with sulfur scavenging functionality.

6. The method of claim 1 wherein the concentration of the acrylate-based additive in the treatment fluid is from about 0.5% to about 15% by weight of the treatment fluid.

7. The method of claim 1 wherein the acrylate-based additive is provided in a closed storage tank system at a site where a well bore penetrating at least a portion of the subterranean formation is located, the tank system being equipped with at least an internal temperature probe and transmitter for remote monitoring of the temperature in the closed storage tank system.

* * * * *